United States Patent [19]
Curtis

[11] 4,015,311
[45] Apr. 5, 1977

[54] BUCKLE WITH A VISUAL TENSION INDICATOR

[75] Inventor: Gary Martin Curtis, Seattle, Wash.

[73] Assignee: Illinois Tool Works Inc., Chicago, Ill.

[22] Filed: Apr. 28, 1976

[21] Appl. No.: 681,108

[52] U.S. Cl. .............................. 24/23 R; 24/23 W
[51] Int. Cl.² ........................................ F16L 33/00
[58] Field of Search .............. 24/23 R, 23 W, 23 B, 24/23 EE, 20 W

[56] References Cited
UNITED STATES PATENTS

| | | | |
|---|---|---|---|
| 2,075,720 | 3/1937 | Hoffmann | 24/23 B |
| 2,914,827 | 12/1959 | Crammond | 24/23 B |

Primary Examiner—Bernard A. Gelak
Attorney, Agent, or Firm—Robert W. Beart

[57] ABSTRACT

This invention relates to a buckle usable for securing the two ends of a looped band together about a workpiece, the new and unusual feature being directed to the provision of a distortable element provided in the buckle body which as a tension applying tool draws up on the complementary band the distortable element of the buckle gives a visual indication of the appropriate or predetermined tension having been applied to the band. Thereafter, the buckle and band are permanently set relative to each other.

4 Claims, 5 Drawing Figures

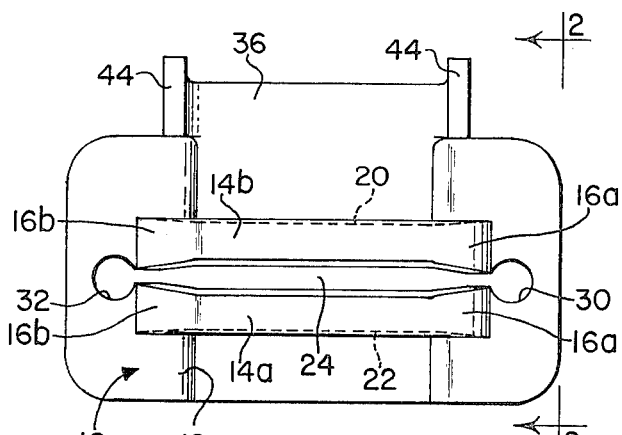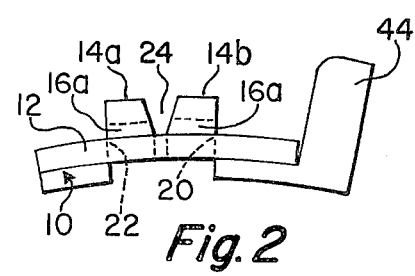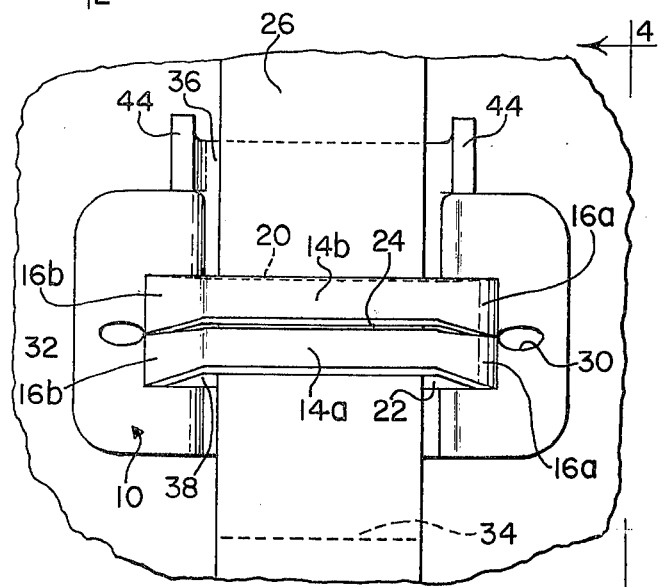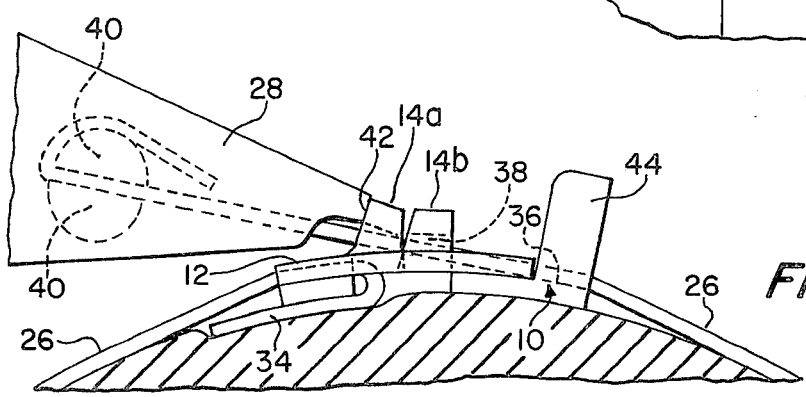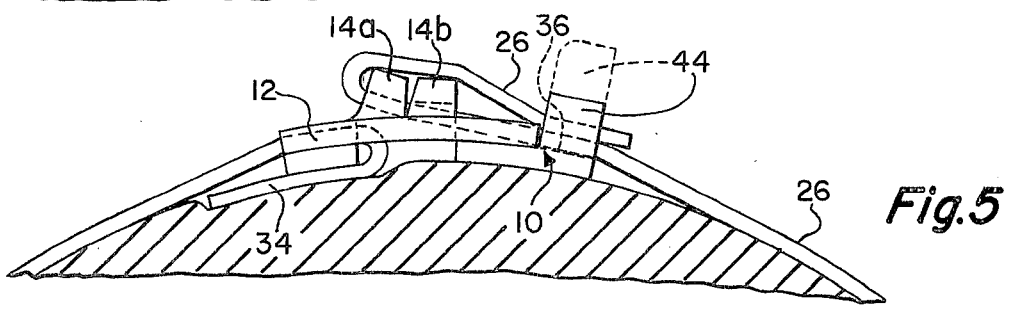

BUCKLE WITH A VISUAL TENSION INDICATOR

This invention relates generally to buckle devices used for securing together overlapping ends of a strap, tape or the like used for banding lamp posts, boxes, wooden pilings, pipe joints, and the like.

It is an object of the invention to provide an improved buckle, which buckle can be applied in the conventional manner contemplated by the prior art but which provides visual indication that a predetermined tension has been applied to the band so that prior to setting of the band relative to the buckle the person applying the band is assured that an appropriate application of tension has been accomplished. Still another object of the invention is to provide visual indicator means of the type contemplated which can be applied to a variety of forms of buckles, the only limitation being that the buckle must have a bottom and top wall and side walls to present an orifice or opening through which a free end of the complementary band may be passed with the other end of the band affixed to the buckle, and with the buckle providing an element against which an applicating tool can thereafter be applied so that distortion of the buckle to accomplish its engineered purpose may be achieved.

A still further object of the invention is to provide various forms of buckles of the conventional types presently known to the strapping or banding industry provided with the visual tension indicating means which adds little or no cost to the product by reason of the economical manner in which the invention may be provided in such a part.

Other and further objects, features and advantages of the invention will become apparent as the description of the preferred embodiments are described.

BRIEF DESCRIPTION OF THE DRAWINGS

FIG. 1 is a top view of a form of buckle with the invention clearly disclosed and shown.

FIG. 2 is a side view of the buckle taken along the lines 2—2.

FIG. 3 is a plan view of the buckle with an associated complementary strap showing the buckle after its distortion to indicate than an appropriate or desired degree of tension has been applied to the band and the object with which the band is associated.

FIG. 4 is a side view of the buckle shown in FIG. 3 together with an associated band tensioning tool visualizing the manner in which the tool functions relative to the buckle to cause distortion of the buckle and the visual indication that a predetermined tension has been applied.

FIG. 5 is a side view of one embodiment of the invention as shown in FIG. 4 after application of tension to the strap and setting or accomplishing permanent locked relationship of the free end of the strap relative to the buckle body.

DESCRIPTION OF THE PREFERRED EMBODIMENT

The buckle comprising this invention and shown in a preferred embodiment may be seen in FIG. 1 and consists of a body portion or body member 10 having a bottom wall 12 as can be seen in any of the figures but is especially visual in FIGS. 4 and 5, a top wall 14a and 14b, and side wall portions 16a and 16b. As shown in this preferred embodiment, the bottom and top walls 12 and 14 in conjunction with the side wall portions 16a and 16b form a rectangular opening to afford a passageway for both ends of the strap to be mounted through a portion or entirely therethrough. The form of the buckle shown as a preferred embodiment is a substantially scrapless device with the top wall being formed upwardly from the bottom wall of an initially integral piece of material, the slits or slots 20 and 22 being provided which permits such forming. In this substantially scrapless form, substantial savings are realized to provide a buckle. Other forms of buckles which can be used with the invention and are conventional in the trade consist of a strap of material being formed into a substantial elongated loop such as shown in the U.S. Pat. No. 2,646,107 to Mahn, but still providing the upper and bottom wall portions in substantially parallel relationship with side walls interconnecting the bottom and top walls to provide a throat or opening as has been described relative to the preferred embodiment.

Reference to FIG. 1 discloses the provision of a slot or slit 24, which slot biforcates the top wall 14 into separated discrete portions 14a and 14b. The longitudinal extent of this slot may be varied dependent upon the tension to be applied to the complementary band 26 by a tension applicating tool 28 to be described in greater detail later. As shown in FIG. 1, the slot 24 traverses the entire extent of the top wall and through the top wall 14a and 14b, through the side walls 16a and 16b, and as shown can extend into the marginal portions of the bottom wall 12 as identified by the terminal aperture portions of the slot 24 by portions 30 and 32. The predetermined extent of the slot 24, of course, determines the forces that will be necessary to apply to top wall portion 14 to cause ultimate distortion.

In operation, the buckle which has been described functions as follows and functions as hereinafter described. Particular reference to FIGS. 4 and 5 will facilitate the reader's understanding of the description. Band 26 has been shown as a band with a first end 34 which is passed over the bottom wall portion 12 and reversely bent to present a hook-shape to anchor the first end of the band to the buckle. The band 26 is then wrapped around the object to be encircled, such as a post, a plurality of articles to be banded together or the like, and the second end of the band 26 brought into overlying relation to the opposite end of the bottom wall portion 12 and specifically that portion which I have identified by the numeral 36. It is passed through the open throat heretofore described and marked for purposes of identification by the numeral 38. After passing the band through the throat, it is now associated with a tensioning tool 28 of conventional design, a usual form having an actuating lever which causes a biforcated rod 40 to be rotated and to wrap the free end of the band in encircling relation as it is rotated. This applies a drawing force relative to the band 26 by reason of the nose portion 42 of the tensioning tool 28 being positioned in abutting relation to the margin 22 of the upper wall portion 14. Continued actuation of the tool causes a larger and larger force to be transmitted against the upper wall portion 14a against which it is positioned and ultimately dependent upon its cross-sectional area of the upper wall portion and its anchorage to the buckle to be collapsed or moved in a direction toward the second upper wall portion 14b thus closing the slot 24 which can be visually observed by the person applying the band to the workpiece. Upon collapse of the first upper wall portion toward the second upper wall portion, the operator determines that the proper tension has been applied and now prepares to make the ultimate setting of the second end of the band relative to the buckle. One familiar form is to rotate the tensioning tool 28 away from the workpiece with which the band 26 is associated causing the band 26 to be reversely bent into a position as shown in FIG. 5 overlying the upper wall portion and a portion of the band which was initially passed through the open throat as previously described. Thereafter, the buckle can be provided with a pair of ears 44 which can be bent into overlying relation relative to the band and thereafter the band 26 cut off to make the appearance of a neat installation and to prevent a substantial portion of the band 26 to extend beyond the securing mechanism.

Other well-known means for securing of the free end of the band 26 relative to the buckle include using a nail set (not shown) to distort a portion of the top wall 14 of the buckle together with a portion of the band itself into the cavity lying beneath the band 26 from which the top wall 14 was struck out and formed upwardly. This gives a mechanical interlock which is suitable for many installations and obviously economizes on the amount of banding material used in a particular operation. In such event, the force of the nail set would be applied to top wall 14 while the tension applying tool 28 (such as, for example, as is shown and disclosed in U.S. Pat. No. 2,348,040) retains the band in the position shown in FIG. 4 and after accomplishing the interlocking of the buckle with the band the band would be severed in the general vicinity of the margin of the top wall that had served as the approach point for the tension applying tool during the tightening of the band 26 about the object to be anchored.

The necessity for this invention becomes obvious when one recognizes that persons utilizing devices of this type in many situations are accomplishing installations at street corners, for example, where a minimum of sophisticated tooling is desired. For example, an installation man might be desirous of placing a band with a bracket adapted to accept a screw for mounting of a street sign onto a cement post. He is on a ladder and approaches his task by preassembling the buckle 10 to the first end of a band of sufficient estimated length to encircle the post. He now wraps the band around the post passing the second end of the band through the throat 38 and applies the tension applying apparatus 28 and commences to apply tension to the band. As he continues to draw the band tighter without visual indicating means it becomes impossible to determine when excessive force has been applied to the band and the band might neck and be severed by being drawn beyond its elastic limit to present a final installation which would not readily affix itself to the post in an impinging embracing relation of encirclement so that ultimately it would support the stop sign or the like to be supported by it. By the visual indicating means that have been described by this invention, accurate tensioning of the band member is readily accomplished by predetermined knowledge of the manufacturer of the characteristics of the band and patterning the top wall section 14 to be distortable at the recommended tension to readily indicate to the person making the application that substantially ideal conditions have been accomplished for the desired end result.

While those skilled in the art will appreciate that many forms of buckles and distortable wall portions are contemplated by the above disclosure, I expressly indicate that I am not limiting the application of the principle of my invention to any particular embodiment but intend only to be limited by the claims which I set forth as follows:

I claim:

1. In a buckle for securing ends of a complementary looped band together about a workpiece under predetermined tension, said buckle including a body having substantially parallel spaced top and bottom walls and side walls joining the top and bottom wall to each other, means on said bottom wall of said body to accept and anchor a first free end of the complementary band, said top and bottom walls of said body providing a throat to accept the second free end of the complementary band, said top wall presenting an edge against which a complementary tensioning tool can be seated for stretching the complementary band to a predetermined degree of tension, said top wall having a slot intermediate its margins traversing a substantial portion of its extent and extending between said side walls, a top wall portion at least one side of said slot being distortable as force is applied against the edge by the complementary tensioning tool to visually indicate that the desired tension has been applied, and means for securing the second end of said band relative to said buckle to permanently set the said band relative to said buckle in tensioned condition.

2. In a buckle of the type described in claim 1 wherein said slot traverses the entire extent of said top wall and into at least a portion of said side walls.

3. In a buckle of the type described in claim 1 wherein said visual indicating slot traverses the top wall, the side walls and extends into a portion of the bottom wall from each of said side walls.

4. In a buckle of the type described in claim 1 wherein the means for securing the second end of said band includes a pair of ears formed from said bottom wall of said buckle and adapted to be bent into overlying position of said buckle body to permanently set the tension band in fixed relation to said buckle.

* * * * *